(No Model.)  5 Sheets—Sheet 1.

F. J. LUDINGTON.
MACHINE FOR MAKING BUTTON BACKS.

No. 564,828. Patented July 28, 1896.

(No Model.)  F. J. LUDINGTON.  5 Sheets—Sheet 3.
MACHINE FOR MAKING BUTTON BACKS.

No. 564,828. Patented July 28, 1896.

(No Model.) 5 Sheets—Sheet 4.

F. J. LUDINGTON.
MACHINE FOR MAKING BUTTON BACKS.

No. 564,828. Patented July 28, 1896.

Witnesses
J. H. Shumway
Lillian D. Kelsey

Frank J. Ludington, Inventor
By Atty's
Earle & Seymour

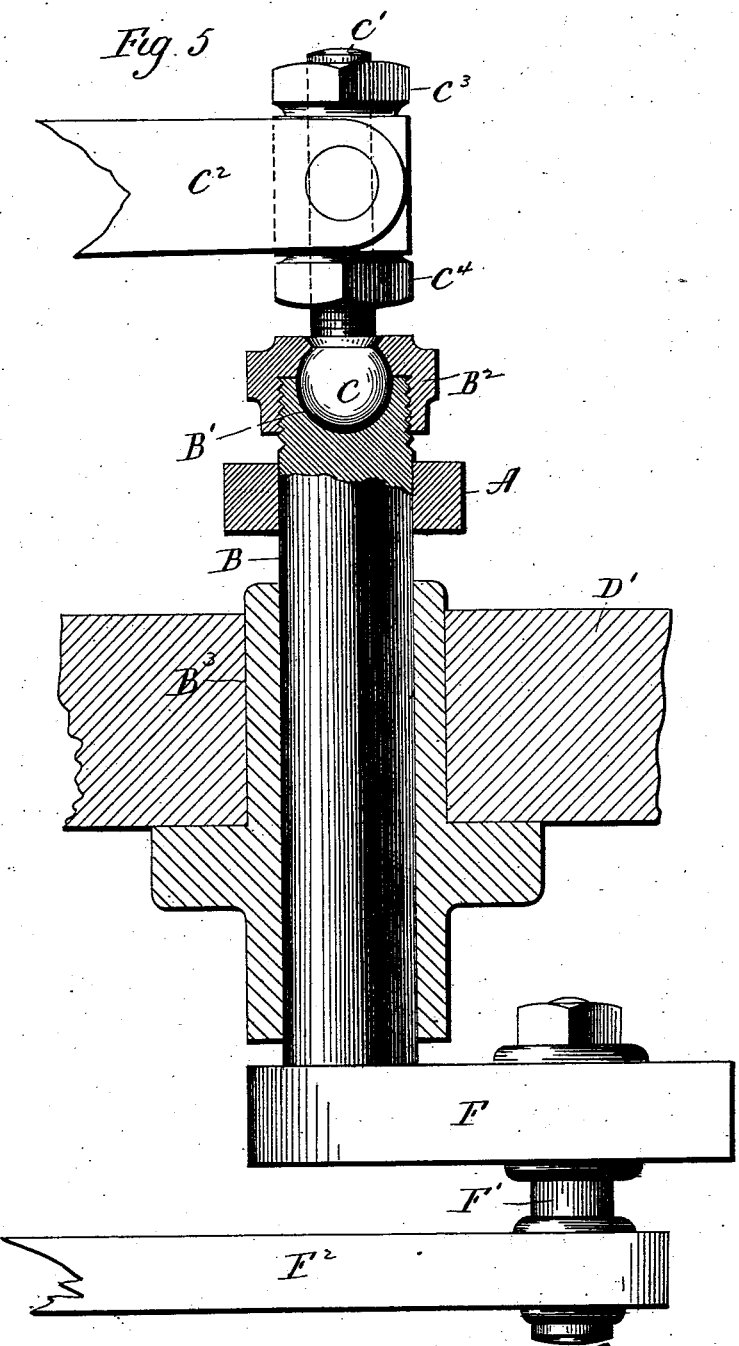

UNITED STATES PATENT OFFICE.

FRANK J. LUDINGTON, OF WATERBURY, CONNECTICUT, ASSIGNOR TO THE L. C. WHITE COMPANY, OF SAME PLACE.

MACHINE FOR MAKING BUTTON-BACKS.

SPECIFICATION forming part of Letters Patent No. 564,828, dated July 28, 1896.

Application filed October 8, 1894. Serial No. 525,249. (No model.)

*To all whom it may concern:*

Be it known that I, FRANK J. LUDINGTON, of Waterbury, in the county of New Haven and State of Connecticut, have invented a new Improved Machine for Making Button-Backs, &c.; and I do hereby declare the following, when taken in connection with the accompanying drawings and the letters of reference marked thereon, to be a full, clear, and exact description of the same, and which said drawings constitute part of this specification, and represent, in—

Figure 1:
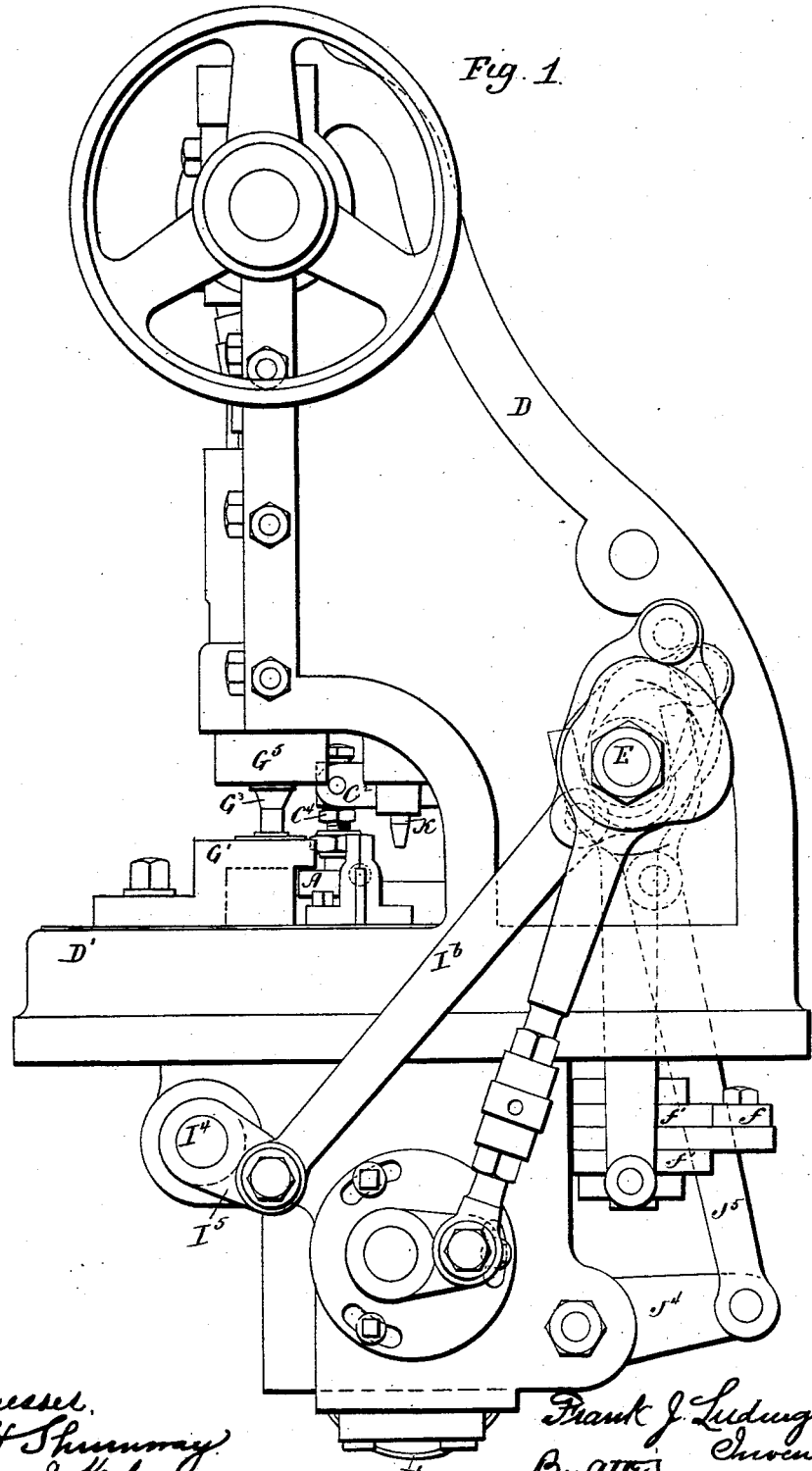
Figure 2:
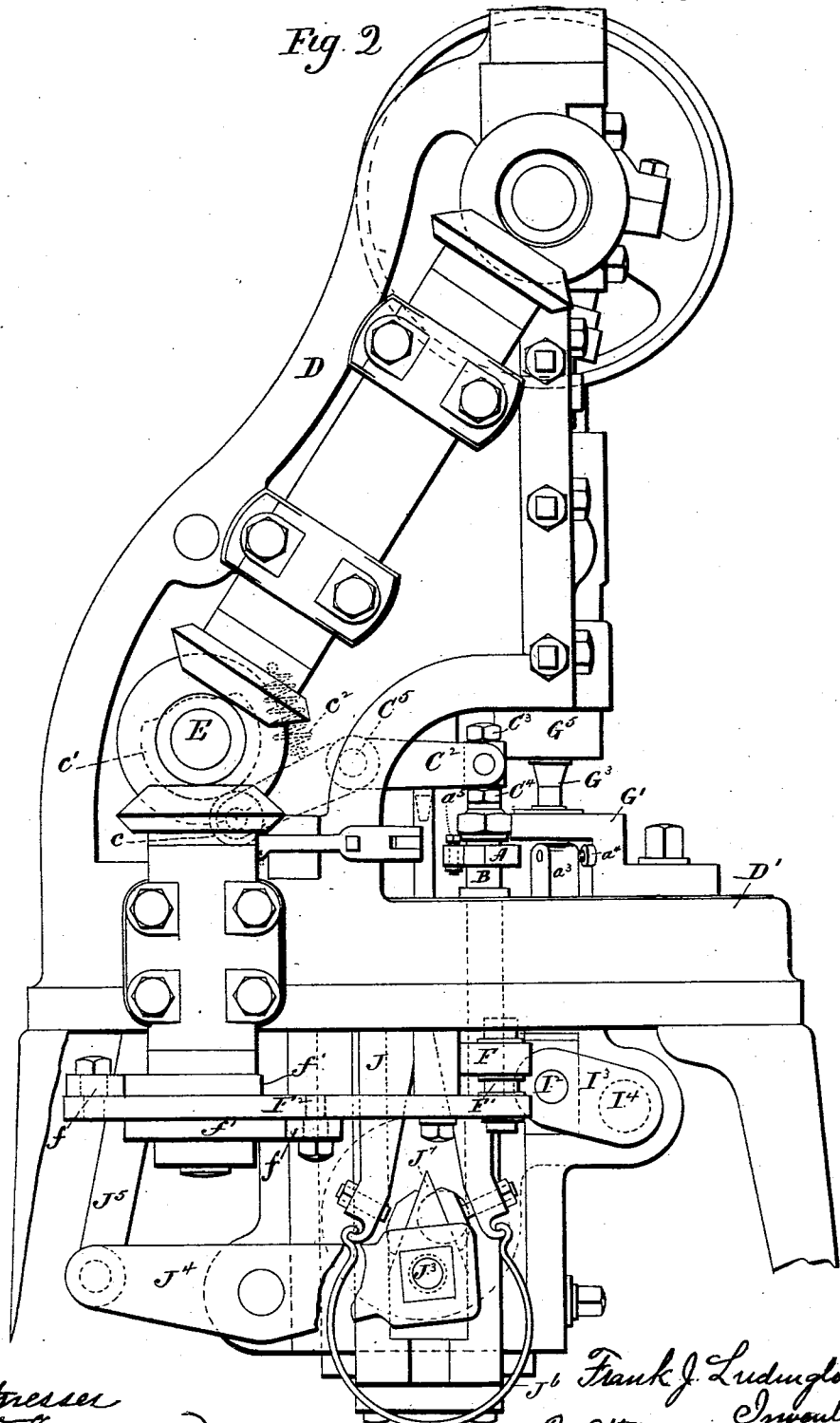
Figure 3:
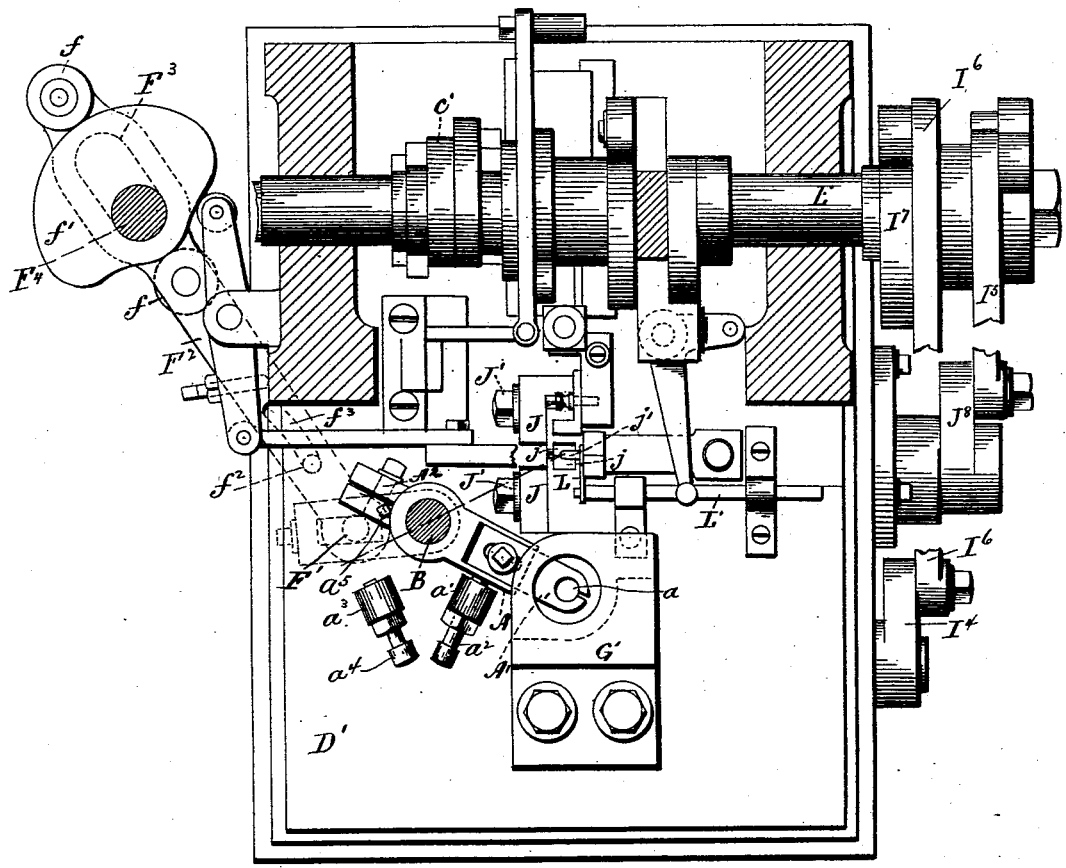
Figure 4:
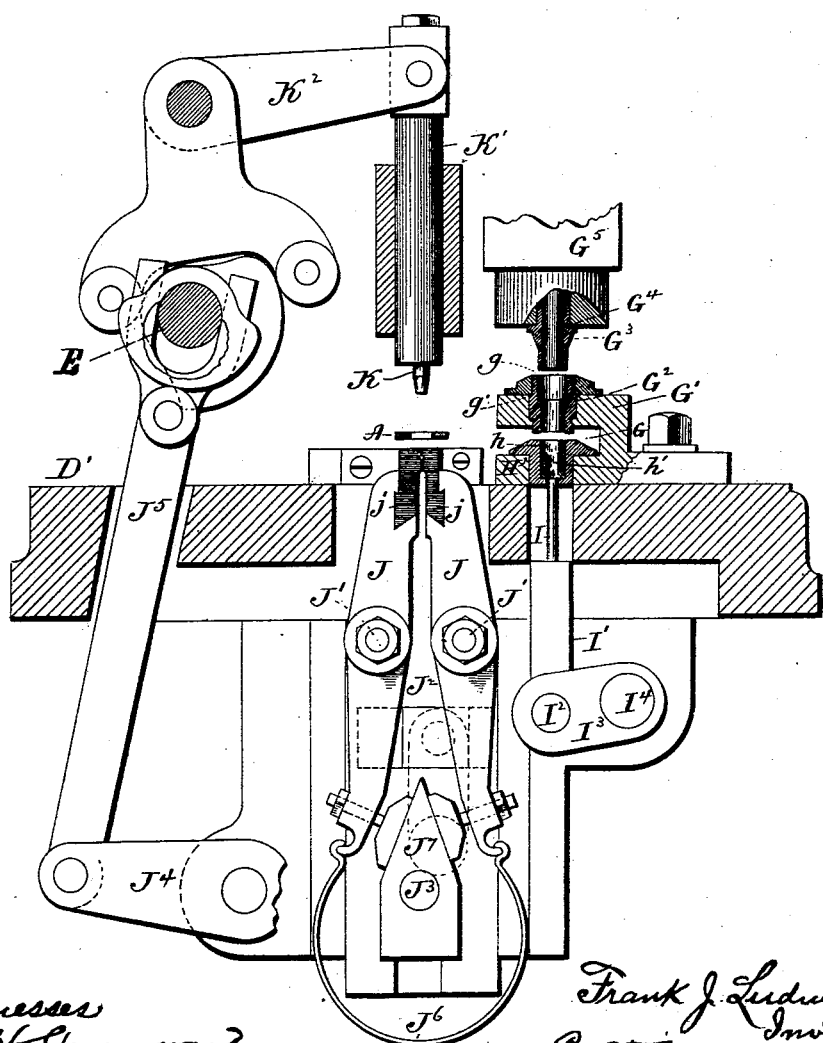

Figure 1, a view in side elevation of a button-back machine embodying my invention; Fig. 2, a similar view from the opposite side of the machine; Fig. 3, a plan view of the bed of the machine and the parts connected therewith, the upper portion of the machine being broken away; Fig. 4, a partial view, partly in elevation and partly in vertical section, of the machine, showing the carrier, the embossing-die, the combined lifter and prick-punch, the cutting and drawing die, the cutter, the drawing-punch, the heading or upsetting punch, and the jaws of the eye-forming mechanism, as well as other related parts; Fig. 5, a view, partly in section and partly in elevation, of the carrier and the means employed for vertically reciprocating and horizontally oscillating it.

My invention relates to an improved machine, designed with particular reference to making button-backs, but also adapted to be used in the production from sheet metal of a variety of small stamped articles, the object being to produce a machine having a large capacity for accurate work.

With these ends in view my invention consists in the combination, with the other instrumentalities of the machine, of a horizontally-oscillating and vertically-reciprocating carrier.

My invention further consists in the combination, with a punch and a die, of a carrier, a stationary embossing-die located below the said die and punch, and a lifter located below the embossing-die and rising through the same to lift the objects embossed therein into the carrier, which conveys them away to another point.

My invention further consists in certain details of construction and combinations of parts, as will be hereinafter described, and pointed out in the claims.

For the illustration and description of my invention I have chosen to show it as embodied in a double-acting press designed for the production of embossed sheet-metal button-backs provided with wire eyes; but I would have it understood that my invention is not limited to embodiment in such a machine, as it obviously may be used in machines designed for the production of other small sheet-metal articles, whether embossed or provided with eyes or not. For instance, I may embody my invention or features of it in a machine designed to produce either plain or embossed collets, such as are used in making buttons, and are in fact eyeless button-backs, or I may embody my invention or features of it in a machine designed to produce small embossed sheet-metal caps for bottle-corks.

Inasmuch as the construction of double-acting presses of the character shown in the accompanying drawings is perfectly well known to those familiar with the art of working in sheet metal, I shall not describe the press further than necessary for an understanding of the parts to which my invention more directly relates; nor shall I at this time give a detailed description of the construction and operation of the eye-forming mechanism, as that is not claimed by me except in combination. A description of the particular eye-forming mechanism shown will be found in United States Patent No. 376,895, granted to me January 24, 1888. I would further have it understood that my horizontally-oscillating and vertically-reciprocating carrier is not limited to use in combination with an eye-forming mechanism, nor with a stationary embossing-die and lifter; nor are the embossing-die and lifter necessarily used in conjunction with an eye-forming mechanism, nor with a vertically-movable carrier.

As herein shown, the horizontally-oscillating and vertically-reciprocating carrier A is mounted upon a vertically-arranged, rotatable, and vertically-movable shaft B, having its upper end constructed with a hemispherical recess B' to receive a ball C, formed at the lower end of a bolt C', mounted in the forward arm of a two-armed lever C², the said ball being held within the said recess by means of a nut-like cap B², applied to the threaded upper end of the shaft B. Nuts C³ and C⁴, bearing upon the upper and lower faces of the forward arm of the lever C², and mounted on the bolt C', are provided for adjusting the same vertically and firmly securing it in its adjusted positions. The lever C² is hung on a horizontal stud C⁵, mounted in the frame D of the press, the rear arm of the lever being furnished with an antifriction-roll $c$, traveling upon a cam $c'$, mounted upon the main driving-shaft E of the press. The action of this cam upon the lever is to periodically depress the forward and lift the rear end thereof, so as to lift the shaft B, and hence the carrier, which thus derives its upward vertical movement. For the downward vertical movement of the carrier a spring $c^2$, Fig. 2, is secured at its lower end to the rear arm of the lever, and at its upper end to a fixed point, such as the frame of the machine, the said spring exerting a constant effort to lift the rear and depress the forward arm of the lever, and to hold the said antifriction-roll $c$ against the said cam $c'$, so that as soon as the rod drops off the lift of the cam the spring acts to lift the rear arm of the lever and depress the forward arm thereof, and hence the carrier. The shaft B has bearing in a bushing B³, located in the bed D' of the press, the projecting lower end of the shaft being furnished with a crank-arm F, adjustably connected by means of a bolt F' with the forward end of an operating-lever F², containing a longitudinal slot F³, through which passes a vertical shaft F⁴, in gear with the horizontal driving-shaft E. Antifriction-rolls $ff$, mounted upon the operating-lever F², and respectively located upon the upper and lower faces thereof, engage with two cams $f'$ $f'$, corresponding to each other and mounted upon the vertical shaft F⁴, on opposite sides of the lever F². The fulcrum for the said operating-lever is formed by a stud $f^2$, depending from the bed of the machine and passing through a segmental slot $f^3$, formed in the lever, which has a combined oscillating and endwise movement and provides for the horizontal oscillation of the carrier, the shaft B whereof turns independently of the bolt C' under the action of the said lever F². It will be understood, therefore, that the character of the connection between the shaft B and the lever C², by which it is vertically reciprocated, makes the reciprocating and oscillating movements of the shaft quite independent of each other.

I may mention in this connection that the particular means employed for vertically reciprocating the shaft, as well as those employed for oscillating it, may be widely varied without departing from my invention, and, further, that different modes than those shown might be employed for connecting the upper end of the shaft with the reciprocating mechanism, so as to permit the shaft to be rotated without departure from my invention.

The carrier is provided at its inner end with an adjustable plate A', containing at its forward end a circular opening $a$, corresponding in diameter to the diameter of the sheet-metal articles to be produced. The rear end of the carrier is split and furnished with a clamping-screw A², whereby the carrier may be moved up and down the shaft B as required, in setting it to properly do its work. A bracket $a'$, mounted in the bed D' of the press, is provided with a screw-stop $a^2$, the projecting inner end of which is engaged by the forward end of the carrier for limiting the forward movement of the carrier-plate A'. A similar bracket $a^3$, mounted upon the bed of the press, is provided with an adjustable screw-stop $a^4$, the projecting inner end of which is engaged by the rear end of the carrier for limiting the rearward oscillating movement of the said plate. A vertically-arranged screw-stop $a^5$, mounted in the rear end of the carrier, is provided for the close adjustment of the downward movement of the carrier and prevents the same from being lowered more than desired on account of some lash or lost motion in its operating connections. I may say here, however, that I do not limit myself to constructing the carrier itself as herein shown and described, as the details of its construction may be varied.

In its horizontal oscillating movement the carrier swings into and out of a deep horizontal recess G, opening inward and formed in a die-block G', bolted to the bed D' of the press. The upper portion of the said block receives a cutting and drawing die G², containing a cutting edge $g$ and a drawing-shoulder $g'$ of any approved construction. An annular cutting-punch $g^3$ coöperates with the cutting edge $g$, while a cylindrical punch G⁴, located within the annular punch, coöperates with the drawing-shoulder $g'$. The said punch and cutter are mounted in a gate-head G⁵, and each has its own operating connections, so that they operate differentially, which is to say, so that the cutter descends and cuts the metal prior to the descent of the punch, which follows the cutter and forces the blank cut downward against the drawing-shoulder $g'$ and through the die.

The particular instrumentalities for differentially reciprocating the cutter and punch I will not describe, inasmuch as they are very well known to those familiar with double-action presses.

Directly below the cutting and drawing die G², I locate an embossing-die H, which is stationarily mounted in the lower portion of the die-block G'. The said embossing-die will of course vary widely in its character, according to the work which it has to do, but it will be shaped so as to be acted upon by the punch G⁴. As herein shown, it contains a central cavity $h$, corresponding in diameter to the diameter of the punch and having its bottom cut to do the embossing required. It is also constructed with a vertical opening or bore $h'$, centrally intersecting the bottom of the cavity $h$ and provided for the playing up and down through the die of a combined lifter and prick-punch I, mounted in a plunger $I'$, the lower end of which is connected by a pin $I^2$ with the inner end of a crank-arm $I^3$, secured at its opposite end to a horizontal shaft $I^4$, also carrying a crank-arm $I^5$, connected with the lower end of an operating-lever $I^6$, actuated by a cam $I^7$ on the shaft E, whereby the said combined lifter and punch is vertically reciprocated through the embossing-die.

It will be understood that the punch $G^4$ has a depression or recess formed in its face to accommodate the pointed end of the prick-punch I. This depression or recess is old, and not, therefore, shown.

Although the described carrier, embossing-die, and lifter may be used in other connections than in combination with an eye-forming mechanism, it is thought that it will be most convenient to describe their use in that connection before proceeding to a description of their operation.

As before stated, the eye-forming mechanism of the machine illustrated is constructed in accordance with that disclosed in United States Patent No. 376,895, granted to me under date of January 24, 1888. I will not, therefore, describe the said mechanism further than the identification of some of its main features. It comprises two corresponding pivotal jaws J J, hung upon studs $J'$ $J'$, mounted in a block $J^2$, connected by a crank $J^8$ with the driving-shaft E. The lower ends of the jaws are connected by means of a spring $J^6$, which tends to draw their lower ends together and separate their upper ends, while their reverse movement is effected by means of a wedge $J^7$, operated through the lever $J^4$, which is connected with the said wedge by means of a stud $J^3$ and operated through a crank $J^5$ by the said driving-shaft E. The upper ends of the jaws are provided with dies $j$, over which the wire is fed, and by the upward movement of one of which the wire is cut off. After this the jaws rise and fold the short length of wire around a forming-pin $j'$, leaving the ends of the wire standing upright above the faces of the dies and the eye proper within the dies. The means for feeding and guiding the wire do not require attention. Directly above the dies there is located an upsetting-punch K, mounted in a plunger $K'$, secured at its upper end to one arm of the bell-crank lever $K^2$, also actuated from the driving-shaft E. An ejector-plate L, Fig. 3, passing over the forming-pin $j'$, is mounted upon an ejector-rod $L'$, which is reciprocated as required to eject the formed eyes from the pin. Other eye-forming mechanism might, of course, be employed in the place of what has been shown and briefly described.

Having now described in detail the construction of a button-back machine embodying my invention, I will proceed to set forth the operation of the machine, to which sheet metal in strips and wire is fed. The operation of the machine will be understood by describing the formation of one button-back.

The machine having been properly timed, the cutter $G^3$ descends and cuts a circular blank from the sheet-metal strip upon the cutting edge $g$ of the cutting and drawing die $G^2$. While the cutter lifts, the punch $G^4$ descends and forces the blank down upon the drawing-shoulder $g'$ of the die and presses the blank beyond the said shoulder, whereby it is drawn into a shallow cup-like form. The continued downward movement of the punch $G^4$ forces the blank out of the die and through the carrier-plate of the carrier and into the embossing-die, where the blank is embossed by the downward pressure of the punch upon the cut bottom of the recess in the embossing-die. At the same time that the blank is being embossed it is having a small central opening formed in it by means of the combined prick-punch and lifter I, which at this time is in a stationary position with its prick-pin standing above the bottom of the recess of the embossing-die. The blank having now been formed, embossed, and punched, and being held between the punch and combined lifter and prick-punch, the two parts rise together and lift the back into the center of the circular opening in the carrier-plate. The drawing-punch now rises and the combined lifter and prick-punch descends, so as to free the carrier and leave the button-back in the carrier-plate, wherein it is retained by the friction of its edges upon the walls of the circular opening thereof. The carrier-plate is now swung with the carrier over the jaws of the eye-forming mechanism and stopped, with the perforation of the button-back carried by it, in line with the projecting ends of the wire of an eye which is held by the jaws. The carrier is now allowed to descend, so as to bring the button-back directly or very nearly into engagement with the said ends of the eye, after which the upsetting-punch comes down and causes the ends to pass through the button-back and spreads them upon the inside thereof. The ejector now acts to strip the eye, and hence the button-back, from the forming-pin, and the operations above set forth are repeated. It will be noted that the carrier is swung back into the die-block before the next button-back is cut and embossed, so as to be in readiness to receive it after it has been embossed and punched. I should also note that the carrier is vertically lifted directly after the upsetting-punch retires, so that it is in its lifted position when it is swung back into the die-block.

By providing for the vertical movement of the carrier, in addition to its oscillating movement, I am enabled to bring the button-back into closer relations with the eye preparatory to the action of the upsetting-punch, which combines the eye and back. By thus reducing the distance between the eye and back when they are united, I secure greater accuracy of work than is possible in machines in which the carrier is not so moved, while by employing an embossing-die and lifter, in connection with the cutting and drawing die, I am enabled to emboss the button-backs at the same time they are formed, instead of doing the embossing work in another machine, as has long been customary, and with obvious economy.

In a machine utilizing my invention for the production of plain or embossed collets or perforated eyeless button-backs the eye-forming mechanism shown herein would be replaced by a punch and die for perforating the blanks; but the ejector or stripper would be retained for ejecting the collets from the punch and die. On the other hand, in a machine adapted to the production of sheet-metal caps for bottle-corks the eye-forming mechanism would of course be dispensed with, nor would the caps be punched; but they would be embossed. In such a machine it would not be necessary to provide for the vertical movement of the carrier, which would, however, coöperate with the cutting, drawing, and embossing dies in the manner set forth, and require the use of a lifter for lifting the embossed caps into the carrier, which would then convey them to one side for their ejection from the machine. I would therefore have it understood that I do not limit myself to the exact construction and combination of parts herein shown and described, but hold myself at liberty to make such changes and alterations as fairly fall within the spirit and scope of my invention.

Having fully described my invention, what I claim as new, and desire to secure by Letters Patent, is—

1. The combination with a punch and die, of a stationary embossing-die, a lifter rising through the said embossing-die, and a horizontally-oscillating carrier into which the parts produced by the action of the punch and dies are lifted by the said lifter for conveyance by the carrier to another point, substantially as set forth.

2. The combination with a punch and die, and an independent eye-forming mechanism, of a vertically-reciprocating horizontally-oscillating carrier consisting of an arm which swings under the die and conveys the parts formed by the die and punch to the said mechanism for their combination with the eyes formed therein, means for swinging the said carrier-arm horizontally between the punch and die and the said mechanism, and for raising and lowering it with reference to the said mechanism when it is at the limit of its movement with reference to the same, substantially as described.

3. In a button-back machine, the combination with a vertically-reciprocating horizontally-oscillating carrier, of a heading or upsetting punch which forces the parts out of said carrier into position to be combined with a previously-formed eye, and means for oscillating the carrier and for raising and lowering it with respect to the said eye, substantially as set forth.

4. In a button-back machine, the combination with a punch and die, of a stationary embossing-die located below the said die, a lifter arranged to move up and down in the embossing-die, a vertically-reciprocating, horizontally-oscillating carrier, which receives the parts produced by the punch and dies and conveys them to another point, an eye-forming mechanism, and a heading-punch, which forces the said parts out of the carrier into position to be combined with a previously-formed eye in the said mechanism, substantially as set forth.

5. In a button-back machine, the combination with a punch and die, of a horizontally-oscillating, vertically-reciprocating carrier, arranged to swing under the die to receive the parts produced therein, an eye-forming mechanism for working up wire into eyes for buttons, an upsetting or heading punch for uniting the eyes produced in the mechanism and the button parts produced in the die, and means for oscillating and reciprocating the carrier, which is swung back and forth between the die and mechanism and raised and lowered over the latter, substantially as set forth.

6. In a button-back machine, the combination with a punch and die, of a stationary embossing-die located below the said die, a lifter arranged to move up and down in the embossing-die, a horizontally-oscillating carrier which swings under the die and over the embossing-die, and receives the parts produced by the punch and dies, which are lifted into it from the embossing-die by the lifter, substantially as described.

7. The combination with a punch and die, of a horizontally-oscillating and vertically-reciprocating carrier arranged to swing under the die to receive the parts produced by the action of the punch and die, a shaft upon which the said carrier is mounted, means for oscillating the shaft, and means for lifting the shaft vertically, including a vertically-adjustable bolt having ball-and-socket connection with the upper end of the shaft which is thereby adjusted vertically to change the vertical position of the shaft, and hence the carrier, substantially as described.

In testimony whereof I have signed this specification in the presence of two subscribing witnesses.

FRANK J. LUDINGTON.

Witnesses:
GEO. HARRISON,
P. H. BUDGEN.